United States Patent

Hartman

[11] Patent Number: 6,085,394
[45] Date of Patent: Jul. 11, 2000

[54] COUPLER

[75] Inventor: Steven David Hartman, Erin, Canada

[73] Assignee: Industrial Thermo Polymers Limited, Brampton, Canada

[21] Appl. No.: 09/358,449

[22] Filed: Jul. 22, 1999

[51] Int. Cl.[7] ................................................. B65D 63/02
[52] U.S. Cl. ................... 24/16 PB; 24/20 R; 24/20 EE; 285/903
[58] Field of Search ............................. 24/10 PB, 20 R, 24/23 R, 703.3, 30.5 P, 444, 452, 306, 20 EE; 403/283, 309, 310, 313; 285/47, 903, 252, 253, 305

[56] References Cited

U.S. PATENT DOCUMENTS

| | | |
|---|---|---|
| 156,262 | 10/1874 | Terrell . |
| 483,040 | 9/1892 | Binet ................................. 24/20 R X |
| 1,330,737 | 2/1920 | Coffman . |
| 2,249,764 | 7/1941 | Hothersall ................................ 24/20 R |
| 3,311,957 | 4/1967 | Dunn . |
| 4,150,463 | 4/1979 | Brown ................................... 24/16 PB |
| 4,557,510 | 12/1985 | Overmyer ........................... 285/903 X |
| 4,870,721 | 10/1989 | Cohen .................................. 24/16 PB |
| 4,887,339 | 12/1989 | Ballanger .......................... 24/20 EE X |
| 5,117,536 | 6/1992 | Beach et al. ........................... 24/20 R |
| 5,123,686 | 6/1992 | Wenk ................................ 24/16 PB X |
| 5,596,790 | 1/1997 | Möller . |
| 5,644,819 | 7/1997 | Lyons . |
| 5,669,113 | 9/1997 | Fay . |

*Primary Examiner*—Anthony Knight
*Assistant Examiner*—Robert J. Sandy
*Attorney, Agent, or Firm*—Eugene J.A. Gierczak

[57] ABSTRACT

A coupler and a method for securing foam tube insulation elements to one another for pipes, comprising of a strip having a top surface and a bottom surface. The top surface may have a series of tab-like projections that define openings between the top surface and the bottom surface. The top surface may also have a series of teeth.

21 Claims, 3 Drawing Sheets

COUPLER

FIELD OF THE INVENTION

This invention relates generally to a fastening device and more specifically to a coupling assembly used in conjunction with a foam insulation that surrounds pipes so as to avoid gluing foam insulation joints.

BACKGROUND OF THE INVENTION

Numerous fastening or clamping devices have been developed to band various articles to one another such as ducts, pipes, and cans. There are even devices used in baling substances such as cotton. The majority of these devices have often required special clips, or straps and have been difficult to operate in an expedient fashion. Moreover, when used in connection with pipes, these devices have required more than one person to install and have not been reusable.

Prior art fasteners and locking devices have been devised to address the aforenoted problems. For example, U.S. Pat. No. 5,596,790 issued on Jan. 28, 1997 to Möller. This patent relates to a hose clamp having a clamp body which encloses a hose end in a ring formation with overlapping ends.

Lyons is the owner of U.S. Pat. No. 5,644,819 which issued on Jul. 8, 1997. This patent relates to the clamp including a pawl resiliently projected into the passage, the pawl including a lead cam surface adapted to co-act with the teeth as the band is passed through the clamp to deflect the pawl into opening condition of the passage. The clamp includes a barb in opposed relation to the pawl. The pawl and the barb function when the band is tightened so as to engage within the adjacent openings the teeth which lock the band against the retractile movement from the clamp.

U.S. Pat. No. 5,669,113 issued to Fay on Sep. 23, 1997. This patent relates to a clamp including an overlapping end portion having a plurality of apertures spaced longitudinally from one another with each aperture having an inward projection. An ear projects outwardly between the aperture and an elongated slot in the overlapping portion. The lapped portion includes a plurality of openings, each having an outwardly projecting hook. The hooks and projections are geometrically shaped to, upon engagement with one another, laterally center the lapped and lapping portions and interlock the portions to one another.

U.S. Pat. No. 4,887,339 was issued on Dec. 19, 1989 to Bellanger. This patent relates to a strip of polymeric sheet material adapted to cut into lengths to form releasably engageable pieces of a fastener. The strip has a row of tab-like parts bent along bend lines out of the plane of a main part of the strip to define an opening through the strip. The tab-like parts on each of two lengths of the strip are simultaneously fully inserted through the openings in the other length with the tab-like parts projecting generally in opposite direction, the edge surfaces of the tab-like parts on one length will make frictional engagement with the edge surfaces of the main part of the strip on the other hand to frictionally hold the lengths in releasable engagement.

Beach et al is the owner of U.S. Pat. No. 5,117,536 which issued on Jun. 2, 1992. This patent relates to a binding strap with integral connecting structure and anti-disengagement feature.

U.S. Pat. No. 3,311,957 issued on Apr. 4, 1967 to V. R. Dunn. This patent relates to a self-locking strap involved in the connection of pipe insulation.

J. H. Coffman is the owner of U.S. Pat. No. 1,330,737 which issued on Feb. 10, 1920. This patent relates to a coupling clamp for hoses. R. Terrell is the owner of U.S. Pat. No. 156,262 which issued on Oct. 27, 1874. This patent relates to bale-ties.

U.S. Pat. No. 2,249,764 issued to J. M. Hothersall on Jul. 22, 1941. This patent relates to a locking band adapted for permanently securing together cans having end seams and arranged in a stacked formation. The locking band comprises of a substantially flat split ring adapted to engage around adjacent end seams of the stacked cans. A plurality of inwardly struck longitudinally and transversely spaced rigid holding lugs are formed in the ring and arranged around the ring for engaging and pressing together the adjacent end seams of the cans so as to uniformly hold them against lateral separation. A means is located at the ends of the split ring for clamping the split ring in the end seam holding position.

There is a need for utilizing a fastener to releasably secure abutting ends of two foam insulating members that are commonly used to insulate either the hot or cold cooler pipes formed in a house or commercial establishment. Although these hollow insulating tube members secured around water pipes in end to end fashion, a gap between adjacent foam members can develop due to very large contraction and expansion coeffecients which affect the foam members as a result of temperature variations. It is usually necessary to actually glue abutting ends of the foam tube insulation to each other which is generally time consuming and expensive and not very effective when there are further flucuations in temperature and the foam tube insulation expands and contracts again.

Thus a coupler for securing foam insulation elements which may be easily installed, is reusable and provides an effective seal between two pieces of foam pipe insulation elements or tubing regardless of the very large expansion and contraction coeffecients, and without the need for glue is desirable.

SUMMARY OF THE INVENTION

An object of one aspect of the present invention is to provide an improved coupler for securing foam insulation elements or tubing to pipes.

In accordance with one aspect of the present invention, there is provided a coupler for securing foam tube insulation elements for pipes comprising of a strip having a top surface and a bottom surface. The top surface may have a series of tab-like projections that define openings between the top surface and the bottom surface. The top surface may also have a series of teeth.

The top surface of the strip may associate with the foam tube insulation elements that surround a pipe so that the series of teeth penetrate the foam tube insulation elements. The tab-like projections may secure the strip around the foam tube insulation elements when a tab-like projection passes through an opening between the bottom surface and the top surface of the strip. The tab-like projection may associate or rest on the top surface of the strip so as to provide a secure and tight fit of the coupler to the foam tube insulation.

Conveniently, the strip may be further defined as having a first end and a second end. The openings at the first end of the strip may then associate with the tab-like projections at the second end of the strip when the strip is around the foam tube insulation elements. Preferably the strip may be made of stiff, flexible, polymeric sheet material.

Advantages of the present invention include the following: impedes expansion and contraction of foam insulation elements at the joint opening; installation requires only one person; timely and easy installation; reusable coupler; inexpensive to make; one size fits all sizes of pipes; can be manufactured in a continuous band and cut to any required length; and does not require any gluing or specialty tools to install.

BRIEF DESCRIPTION OF DRAWINGS

A detailed description of the preferred embodiments are provided herein below by way of example only with reference to the following drawings, in which.

Figure 1:
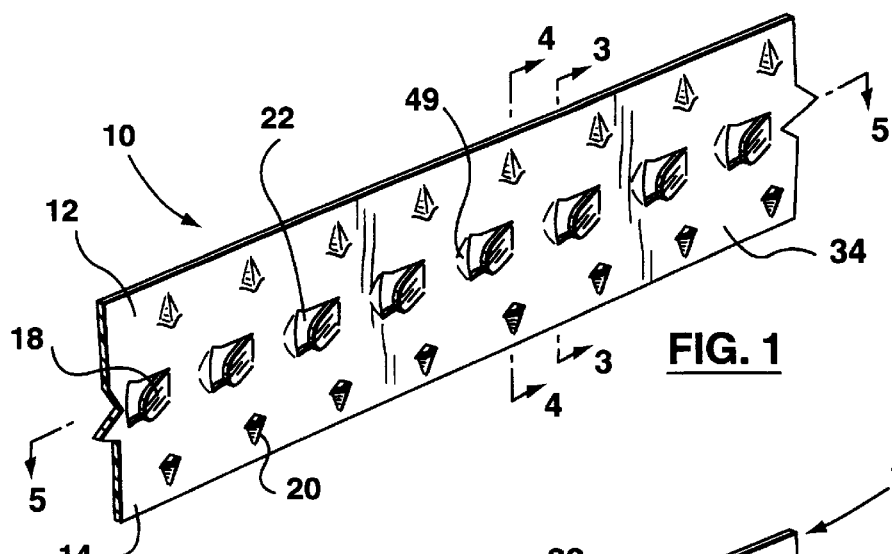
FIG. 1, is perspective view from the top or one side which, illustrates a flexible strip or coupler in accordance with a preferred embodiment of the present invention.
Figure 2:
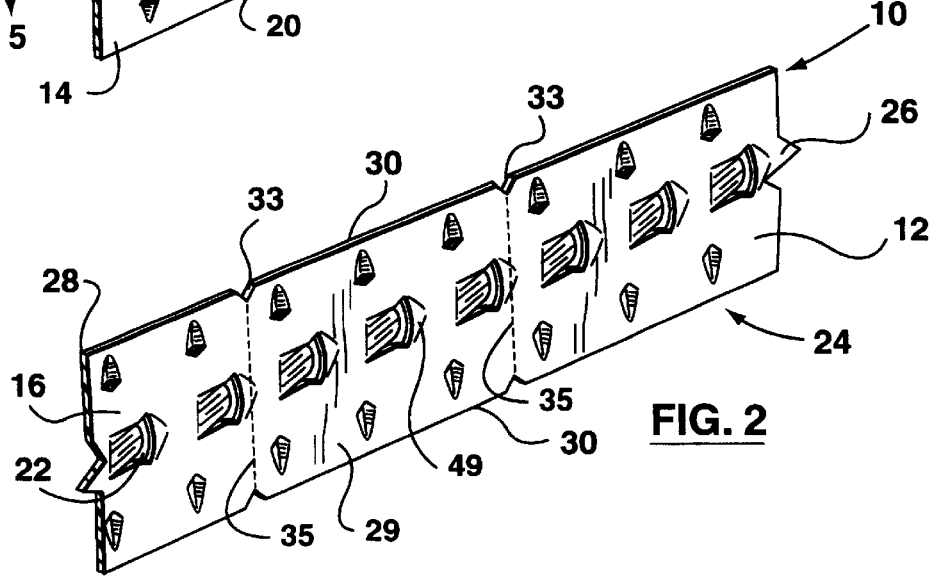
FIG. 2, is a perspective view from the bottom or other side of the coupler.
Figure 3:
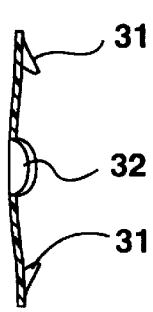
FIG. 3, is a sectional view of the coupler taken along the line 3—3 of FIG. 1.
Figure 4:
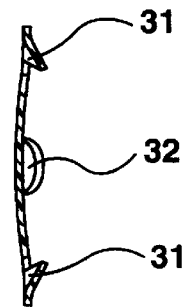
FIG. 4, is a sectional view of the coupler taken along the 4—4 of FIG. 1.

In the drawings, preferred embodiments of the invention are illustrated by way of example. It is to be expressly understood that the description and the drawings are only for the purpose of illustration and as an aid to understanding, and are not intended as a definition of the limits of the invention.

In the description which follows, like parts are marked throughout the specification and the drawings with the same respective reference numerals. The drawings are not necessarily to scale and in some instances proportions may have been exaggerated in order to more clearly depict certain features of the invention.

Referring to FIGS. 1–5 there is illustrated in a perspective view, a flexible strip or coupler 10 for securing foam tube insulation elements 11 in accordance with a preferred embodiment of the present invention. The coupler 10 includes a strip 12 comprising of a first or top surface 14 and a second bottom surface 16, a series of tab-like projections 18, and a series of teeth 20. The tab-like projections 18 may be located on the top surface 14 of the strip 12. The tab-like projections 18 may define openings 22 or passage-ways between top surface 14 and the bottom surface 16.

In a first unlocked position 24, the coupler 10 or strip 12 may be in a flat position with the top surface 14 exposing the series of tab-like projections 18 and the series of teeth 20. The strip 12 may be further defined as having a first end 26, a second end 28 and side edges 30. The tab-like projections 18 may be further defined as a series of hooks 32.

The hooks 32 may be positioned on the top surface 14 equi-distance from one another and generally parallel to the side edges 30. More specifically the hooks 32 may be oriented in a row in the middle of the top surface 14 of the strip 12. The series of teeth 20 may be spaced equi-distance from one another and disposed adjacent to each of the side edges 30 of the strip 12. More specifically, the teeth may be arranged in a series of rows 31 that run parallel to the side edges 30 of the strip 12. The series of teeth 20 are adapted to pierce or bite into the foam tube insulation elements 11 so as to secure the coupler 10 to the foam tube insulation elements 11 that may be wrapped around a pipe 36.

The strip 12 may be manufactured from stiff flexible polymeric sheet 29 and formed into a continuous strip 34 or band. The length of strips 12 required for a particular joint may then be cut from the continuous strip 34. Therefore the coupler 10 may custom made or cut so as to accommodate a variety of pipe sizes. Optionally the strip may be wound around and unrolled to the desired length sufficient to releasably securely embrace the circumference of two abutting ends of foam tube members. The strip may be cut by scissor or knife. Alternatively, the strip may contain a series of notches 33 or serrations 35 which will permit the user to manually rip the strip 10 to the appropriate length.

Figure 6:
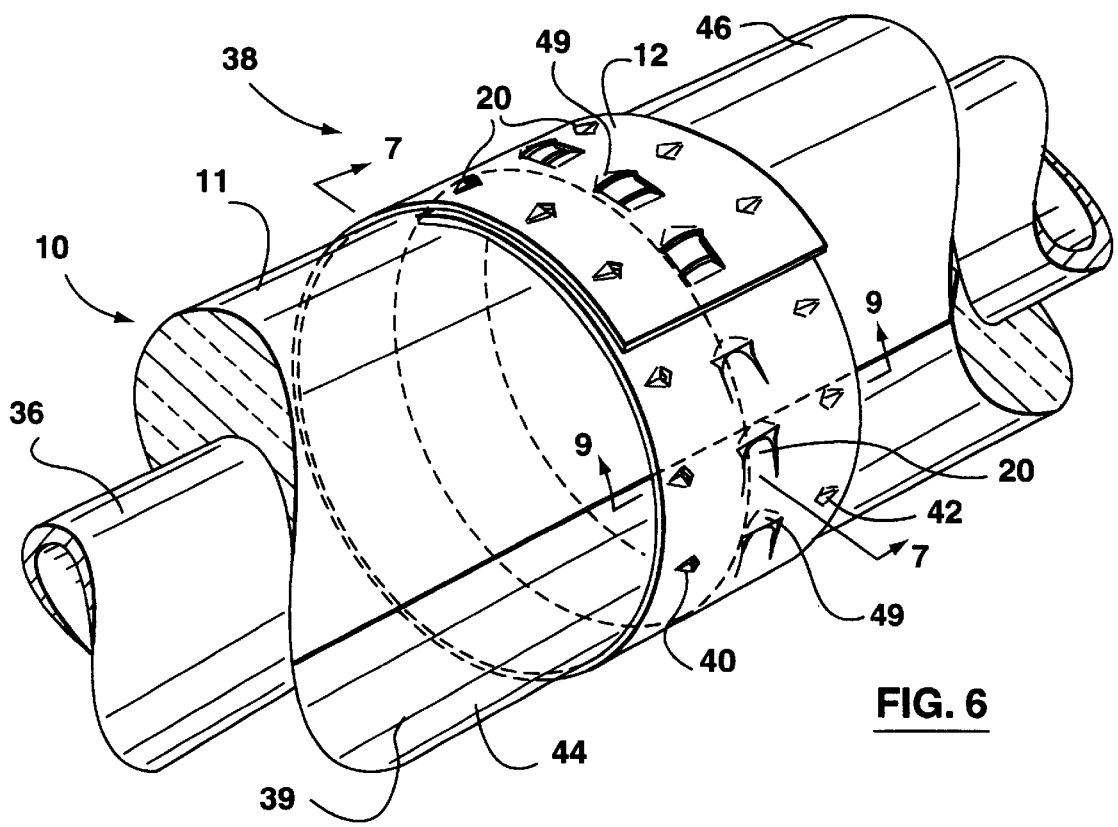
FIG. 6 is a perspective view of the coupler fastening two abutting ends of foam members.

Referring to FIG. 6, in a second locked position 38, the top surface 14 of the strip 12 will associate with the foam tube insulation elements 11 so that the series of tab-like projections 18 and the series of teeth 20 are associating or facing the foam tube insulation elements 11. More specifically, the series of teeth 20 may pierce or bite the circumferential wall 39 of the foam tube insulation elements 11 so as to secure the coupler 10 to the foam tube insulation elements 11.

The series of rows of teeth 31 may be further defined as a first row 40 and a second row 42, whereby the first row of teeth 40 may pierce a first foam tube insulation element 44, and a second row 42 may pierce a second foam tube insulation element 46 so that the coupler 10 joins both the first and second foam tube insulation elements 44 and 46. The location of the series of teeth 20 reduces the possibility of the joint between the first and second foam tube insulation elements 44 and 46 from opening up due to the contraction and expansion of the foam during changes in temperatures, and the subsequent loss of insulating value.

Figure 5:
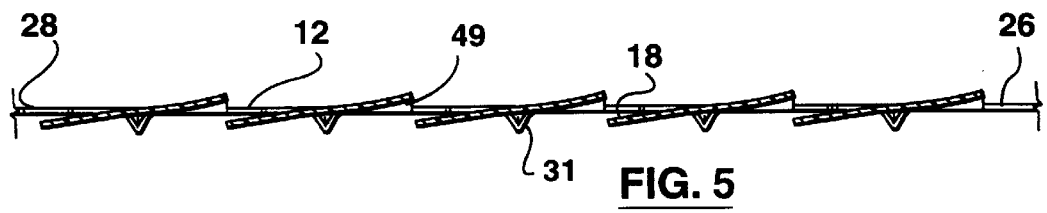
FIG. 5, is a cross-sectional view of the coupler taken along the line 5—5 of FIG. 1.

Referring to FIGS. 5 and 6, the coupler 10 may be tightened to the first and second foam tube insulation elements 44 and 46, by passing at least one tab-like projection 48 through an opening 50 between the top surface 14 and the bottom surface 16. Opening 50 may be formed by stamping the flexible, polymeric sheet 29 to define opening 50, tablike projection 48 and a raised lip or catch 49. The tab-like projection 48 may rest or lock against the top surface 14 of the strip 12. More specifically, the user may pass the tab-like projection 48 located at the second end 28 of the strip, through the opening 50 located at the first end 26 of the strip 12 so that the tab-like projection 48 locks in the opening 50 by locking against the top surface 14 of the strip 12.

The resilience of the strip 12 allows for the strip 12 to bend around the foam tube insulation elements 44 and 46, while the stiffness of the strip 12 creates sufficient tension to hold or lock the tab-like projection 48 against the top surface 14 of the strip 12.

In operation, the user may have two foam tube insulation elements 52 and 54 that are insulting a pipe 56 which the user may wish to join together. The appropriate length of strip 12 may be wrapped around the joint 58 between the two foam tube insulation elements 52 and 54. The first row of teeth 40 may pierce the first foam tube insulation element 52 by applying pressure to the bottom surface 16 of the strip 12. The second row of teeth 42 may pierce the second foam tube insulation element 54 by applying pressure to the bottom surface 16 of the strip 12, thereby connecting the two foam tube insulation elements 52 and 54.

Figure 7:
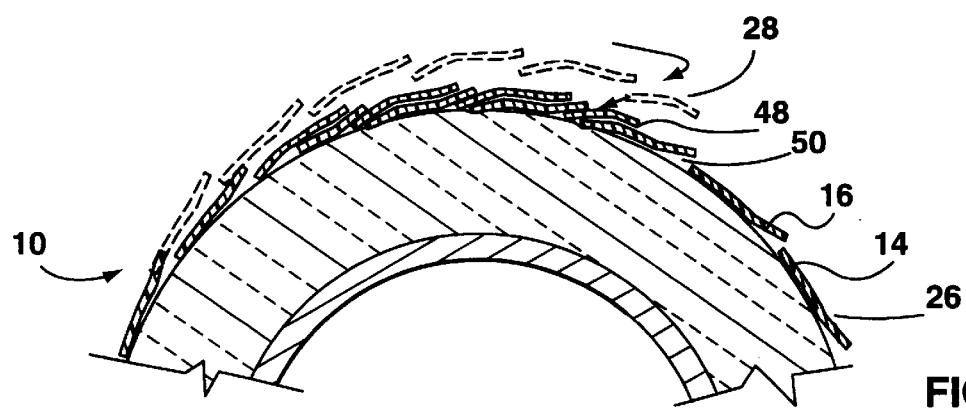
FIG. 7 is a cross-sectional view of the coupler taken along the line 7—7 of FIG. 6.
Figure 8:
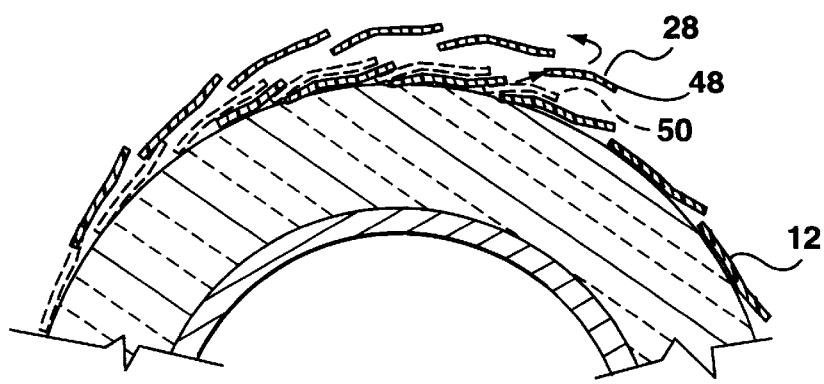
FIG. 8 is a cross-sectional view of the coupler.
Figure 9:
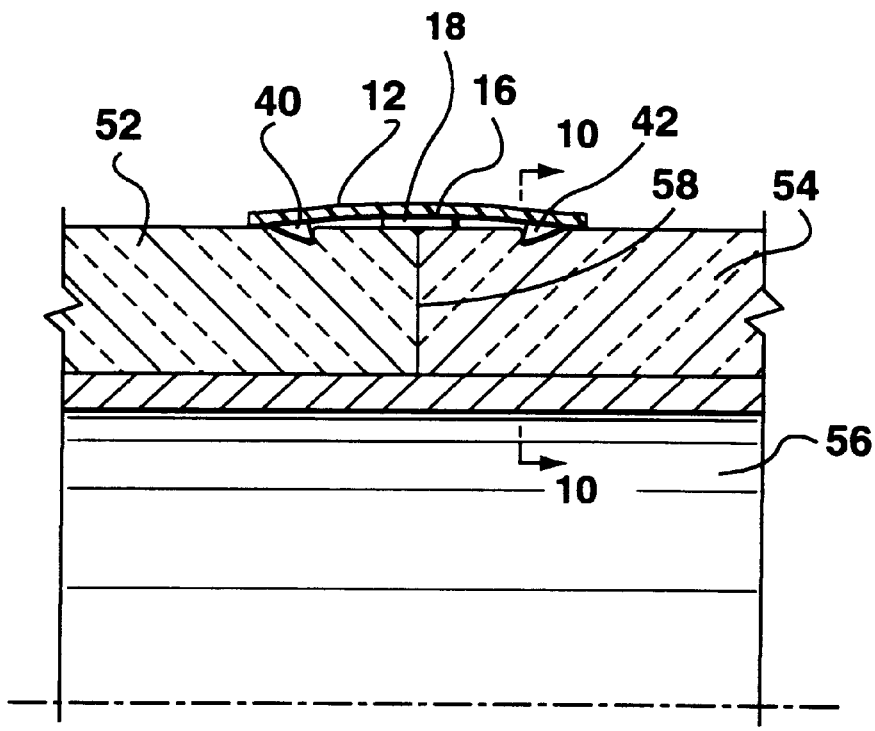
FIG. 9 is a partial cross-sectional view of the coupler taken along the lines 9—9 of FIG. 6.
Figure 10:
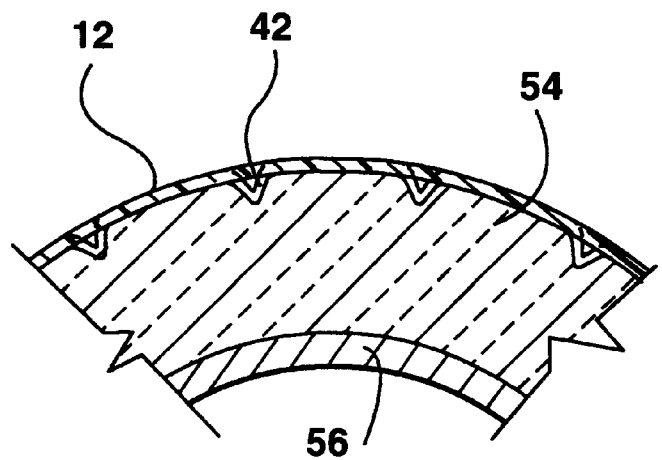
FIG. 10 is a partial cross-sectional view of the coupler taken along the line 10—10 of FIG. 6.

Referring to FIGS. 7 and 8, the user may then tighten the strip 12 by passing a tab-like projection 48 located at the second end 28 of the strip 12 through the opening 50 at the first end 26 of the strip 12 at sufficient tension so that the tab-like projection 48 locks against the top surface 14 of the strip 12. The coupler 10 may be removed or unlocked from the pipe 56, by lifting up on the second end 28 of the strip 12 with sufficient force, thereby releasing the tension on the tab-like projection 48 so that the tab-like projection 48 may move out of the opening 50.

Therefore, the operation of the coupler 10 may be attempted by one user and may be accomplished with more speed and ease than conventional systems involving glue or other adhesives. The coupler 10 may also be used in situations where the joint was previously glued but requires more reinforcement, or where the foam tube insulation elements are not joined together cleanly.

Various embodiments of the invention have now been described in detail. Since changes in and/or additions to the above-described best mode may be made without departing from the nature, spirit or scope of the invention, the invention is not to be limited to said details. If the strip is flexible enough it can be used to abutting ends of foam members that have cross-section that are square, hexagonal or other similar shapes so long as the cross-sections of abutting foam member are substantially similar or identical. Furthermore, the diameter of the foam tubes are substantially the same and in the preferred embodiment are the same so that the fastener can releasably secure the abutting ends of the foam tubes.

I claim:

1. A coupler for securing foam tube insulation elements, comprising:
   (a) a strip having a top surface and a bottom surface;
   (b) a series of tab-like projections on said top surface defining openings between said top surface and said bottom surface; and
   (c) a series of teeth on said top surface; wherein said top surface of said strip being adapted to associate with said foam tube insulation elements so that said series of teeth are adapted to penetrate said foam tube insulation elements; and said series of tab-like projections are for securing said strip around said foam tube insulation elements by said series of tab-like projections passing through said opening from said bottom surface to said top surface of said strip wherein said series of tab-like projections associates with said top surface of said strip in a locked position with said series of teeth penetrated into said foam tube insulation elements.

2. A coupler for securing foam tube insulation elements as claimed in claim 1 wherein said strip is further defined as having a first end, a second end and side edges, wherein said openings at said first end of said strip associates with said series of tab-like projections at said second end of said strip when said strip is in said second locked position.

3. A coupler for securing foam tube insulation elements as claimed in claim 2 wherein said strip is made of stiff flexible polymeric sheet material.

4. A coupler for securing foam tube insulation elements as claimed in claim 3 wherein said series of tab-like projections are spaced equi-distance from one another and are parallel to said side edges of said strip.

5. A coupler for securing foam tube insulation elements as claimed in claim 4 wherein said series of tab-like projections are oriented in the middle of said top surface of said strip in a row.

6. A coupler for securing foam tube insulation elements as claimed in claim 5 wherein said series of tab-like projections are further defined as a series of hooks.

7. A coupler for securing foam tube insulation elements as claimed in claim 3 wherein said series of teeth are spaced equi-distance from one another and are juxtaposed to said side edges of said strip.

8. A coupler for securing foam tube insulation elements as claimed in claim 7 wherein said series of teeth are arranged in rows parallel to said series of tab-like projections.

9. A coupler for securing foam tube insulation elements as claimed in claim 8 wherein said series of tab-like projections are further defined as a series of hooks.

10. A coupler for securing foam tube insulation elements as claimed in claim 9 wherein said series of teeth are arranged in a first row and a second row adjacent to said side edges for piercing said foam tube insulation elements.

11. A coupler for securing foam tube insulation elements as claimed in claim 10 wherein said first row of teeth being adopted for piercing a first foam tube insulation element and said second row of teeth pierces a second foam tube insulation element for connecting said first and said second foam insulation elements.

12. A coupler for securing foam tube insulation elements as claimed in claim 11 wherein said foam insulation elements are applied to pipes.

13. A method for securing a coupler to foam tube insulation elements comprising a strip having a top surface and a bottom surface, said top surface having a series of teeth and a series of tab-like projections defining openings between said top surface and said bottom surface, comprising the steps of:
   (a) placing said top surface of said strip on said foam tube insulation elements;
   (b) applying pressure to said strip such that said series of teeth penetrate said foam tube insulation elements; and
   (c) securing and tightening said strip around said foam tube insulation elements by passing said series of tab-like projections passing through said opening from said bottom surface of said strip so that said series of tab-like projections associate with said top surface of said strip in a locked position.

14. A method as claimed in claim 13 wherein said strip is further defined as having a first end, a second end and side edges, wherein said openings at said first end of said strip associates with said series of tab-like projections at said second end of said strip when said strip is tightened around said foam tube insulation elements.

15. A method as claimed in claim 14 wherein said strip is made of stiff flexible polymeric sheet material.

16. A method as claimed in claim 15 wherein said series of tab-like projections are spaced equi-distance from one another and are parallel to said side edges of said strip.

17. A method as claimed in claim 16 wherein said series of tab-like projections are further defined as a series of hooks.

18. A method as claimed in claim 15 wherein said series of teeth are spaced equi-distance from one another and are arranged in rows parallel to said series of tab-like projections.

19. A method as claimed in claim 18 wherein said series of teeth are arranged in a first row and a second row adjacent to said side edges thereby piercing said foam tube insulation elements.

20. A method as claimed in claim 19 wherein said first row of teeth pierces a first foam tube insulation element and said second row of teeth pierces a second foam tube insulation element thereby connecting said first and said second foam insulation elements.

21. A flexible strip for releasably securing abutting ends of foam elements against separation, said flexible strip comprising:
   (a) tab means defining openings releasably engageable with said tab means for locking said flexible strip when circumferentially embracing said abutting ends; and
   (b) biting means for penetrating each of said abutting ends of said foam elements.

* * * * *